(12) United States Patent
Koegler et al.

(10) Patent No.: US 7,018,073 B2
(45) Date of Patent: Mar. 28, 2006

(54) DATUM STRUCTURE FOR ENSURING ALIGNMENT OF A LAMP ASSEMBLY

(75) Inventors: John M. Koegler, Corvallis, OR (US); P. Guy Howard, Junction City, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 112 days.

(21) Appl. No.: 10/769,322

(22) Filed: Jan. 30, 2004

(65) Prior Publication Data

US 2005/0168993 A1   Aug. 4, 2005

(51) Int. Cl.
*F21V 7/00* (2006.01)

(52) U.S. Cl. .................. 362/296; 362/306; 362/288

(58) Field of Classification Search ................ 362/306, 362/296, 341, 288, 285, 418; 353/85, 87; 313/318.11, 318.1
See application file for complete search history.

(56) References Cited

U.S. PATENT DOCUMENTS

| | | | |
|---|---|---|---|
| 1,450,079 A | 3/1923 | Hawthorne | |
| 3,789,212 A * | 1/1974 | Wagner | 362/306 |
| 4,320,439 A * | 3/1982 | Wiley | 362/3 |
| 4,528,619 A * | 7/1985 | Dolan et al. | 362/519 |
| 4,569,006 A * | 2/1986 | Bergin et al. | 362/549 |
| 4,774,550 A | 9/1988 | Igarashi | |
| 6,155,687 A | 12/2000 | Peterson | |
| 6,179,456 B1 | 1/2001 | Nakamura et al. | |
| 6,428,198 B1 | 8/2002 | Saccomanno et al. | |
| 6,471,356 B1 | 10/2002 | Gohman et al. | |
| 2002/0018186 A1 | 2/2002 | Sea-Huang et al. | |
| 2003/0123031 A1 | 7/2003 | Nelson et al. | |

FOREIGN PATENT DOCUMENTS

| | | |
|---|---|---|
| FR | 2 835 595 | 2/2002 |
| FR | 2 836 984 | 3/2002 |
| JP | 2000112025 | 4/2000 |

\* cited by examiner

*Primary Examiner*—Ali Alavi

(57) ABSTRACT

A light source assembly configured for installation into a reflector assembly including a reflector, the reflecting assembly having a datum structure includes lamp having an emitting portion for emitting light, and a header supporting the lamp and defining a plurality of datum surfaces for engaging corresponding datums that are defined by the datum structure, the datum surfaces are disposed and arranged to assure proper alignment of the emitting portion relative to the reflector.

27 Claims, 9 Drawing Sheets

DATUM STRUCTURE FOR ENSURING ALIGNMENT OF A LAMP ASSEMBLY

BACKGROUND

Digital projectors, such as digital micro-mirror devices (DMD) and liquid crystal devices (LCD) projectors, project high quality images onto a viewing surface. Both DMD and LCD projectors utilize high intensity lamps and reflectors to generate the light needed for projection. Light generated by the lamp is concentrated as a 'fireball' that is located at a focal point of a reflector. Light produced by the fireball is directed into a projection assembly that produces images and utilizes the generated light to illuminate the image. The image is then projected onto a viewing surface. Misalignment of the focal point causes degradation of the image since less light is captured and creates 'hot spots' on the screen instead of a uniform brightness.

Efforts have been directed at making projectors more compact while making the image of higher and higher quality. As a result, the lamps utilized have become more compact and of higher intensity. Higher intensity lamps produce high, even extreme heat. The outer surface of the lamps can approach temperatures of 900 degrees C. As a result, projector designs must account for the intense heat. In addition, losses due to misalignment of the fireball with respect to the reflector are amplified in systems utilizing high intensity lamps.

Some designs attempt to account for the heat by permanently placing the lamp within the reflector. The use of a high temperature 'epoxy' holds the lamp relative to the reflector. Flexible electrodes from the lamp are then placed through two holes in the reflector and are soldered to a metal connection. This connection is made manually, thereby adding expense to the fabrication of the unit. Further, the two holes in the reflector allow light to escape, thereby degrading the image produced. The other end of the metal connection allows wires to be attached from the electrical connector. When the lamp has surpassed its useful life, the costly reflector and lamp assembly, which can be considered as the light generation assembly, is replaced. When the assembly is replaced, the old assembly is discarded.

SUMMARY

A light source assembly configured for installation into a reflector assembly including a reflector, the reflecting assembly having a datum structure includes lamp having an emitting portion for emitting light, and a header supporting the lamp and defining a plurality of datum surfaces for engaging corresponding datums that are defined by the datum structure, the datum surfaces are disposed and arranged to assure proper alignment of the emitting portion relative to the reflector.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A light source assembly configured for installation into a reflector assembly including a reflector, the reflecting assembly having a datum structure includes lamp having an emitting portion for emitting light, and a header supporting the lamp and defining a plurality of datum surfaces for engaging corresponding datums that are defined by the datum structure, the datum surfaces are disposed and arranged to assure proper alignment of the emitting portion relative to the reflector.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
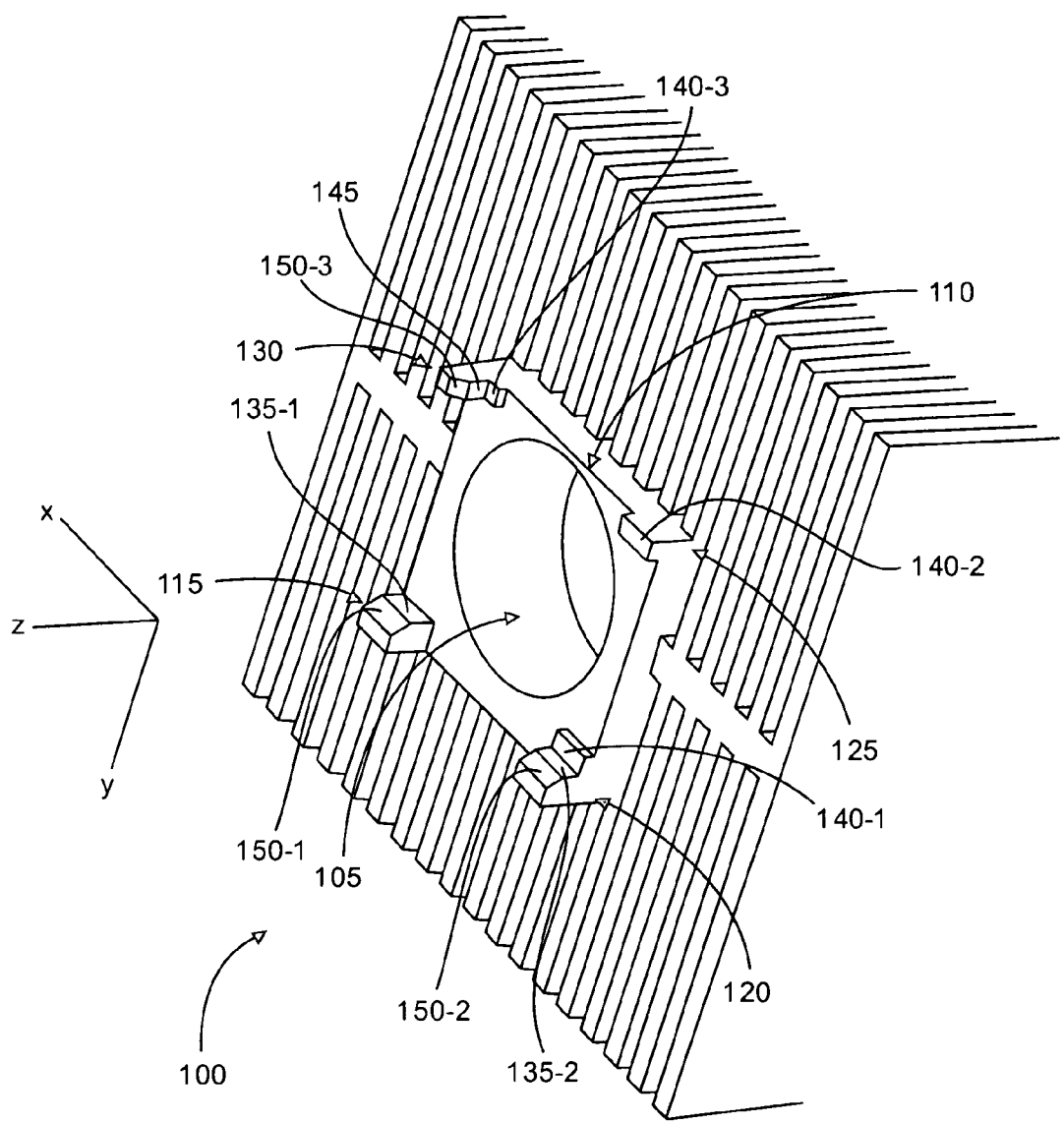
FIG. 1 illustrates an exemplary reflector assembly having a datum structure.

FIG. 1 illustrates a reflector assembly (100) having a reflector opening (105) with a datum structure (110) coupled thereto. The datum structure (110) is configured to allow a lamp assembly to be aligned with respect to and coupled to the reflector assembly (100). Further, the datum structure (110) allows the coupling and alignment to be accomplished without the use of tools.

The reflector assembly (100) may be of any type, including a parabolic or elliptical reflector. Further, the reflector assembly (100) may be configured to be utilized in a number of systems, including projection or television applications. Typical projection television applications make use of a lamp. The reflector opening (105) is an opening defined in the reflector assembly (100). The reflector opening (105) is of sufficient size to allow at least part of a lamp to be passed through. The reflector assembly (100) also includes a datum structure (110) for aligning the lamp with respect to the reflector assembly (100).

For ease of reference the following description is described with reference to an X, Y, and Z coordinate system. This system is described with reference to the origin being at the center of a reflector opening wherein the z axis represents the direction of insertion. Although, the X, Y, and Z axis are described herein as orthogonal (such as in rectangular coordinates), other axes could be used that are non-orthogonal such as with a cylindrical or polar coordinate system.

The datum structure (110) includes first, second, third, and fourth protrusions (115, 120, 125, and 130 respectively) disposed around the perimeter of the reflector opening (105). Each of the protrusions includes at least one datum alignment surface. The first protrusion (115) includes a y-axis alignment surface (135-1). The y-axis alignment surface (135-1) is an alignment datum surface for aligning a lamp assembly in the x-z plane. Accordingly, the x-axis alignment surface (135-1) is substantially parallel to the x-z plane. This alignment is accomplished by placing a corresponding surface of the lamp assembly in contact with the y-axis alignment surface.

The second protrusion (120) includes a y-axis alignment surface (135-2) and a z-axis alignment surface (140-1). Accordingly, the second protrusion contains two datum surfaces, one each for alignment of a lamp assembly with respect to the x-y plane and for alignment with respect to the x-z plane. As a result, the z-axis alignment surface (140-1) is substantially parallel to the x-y plane. Similarly, the y-axis alignment surface (135-2) is parallel to x-z plane. The y-axis alignment surface (135-2) on the second protrusion (120) is coplanar they-axis alignment surface (135-1) on the first protrusion (115). As will be discussed in more detail below, placing two corresponding surfaces in contact with the y-axis alignment surfaces (135-1, 135-2) fully constrains the motion of those corresponding surfaces with respect to the y-axis.

The third protrusion (125) has a z-axis alignment surface (140-2). The z-axis alignment surface (140-2) is a single datum surface for aligning a part with respect to the x-y plane. The z-axis alignment surface (140-2) is coplanar with the z-axis alignment surface (140-1) of the second protrusion (120).

The fourth protrusion (130) includes an x-axis alignment surface (145) and a z-axis alignment surface (140-3). The x-axis alignment surface (145) is parallel to the y-z plane. Accordingly, the z-axis alignment surface (140-3) is substantially parallel to the x-y plane. The z-axis alignment surface (140-3) on the fourth protrusion (130) is substantially coplanar with both of the other z-axis alignment surfaces (140-1, 140-2) on the second and third protrusions (120, 125) respectively.

The first, second, and third protrusions (115, 120, 130) each include beveled surfaces (150-1, 150-2, 150-3). The beveled surfaces (150-1, 150-2, 150-3) allow easier orientation of a corresponding component by guiding surfaces of the component into contact with the datum structure (110).

The configuration of the datum structure (110) ensures that placement of corresponding surfaces of a component in contact with the surfaces of the datum structure will constrain the movement of the component in the x, y, and z directions. This is true of components that are substantially rigid, or that can be modeled as such.

For example, the y-axis alignment surfaces (135-1, 135-2) are substantially coplanar. In other words, a single plane passes through the y-alignment surfaces (135-1, 135-2). This single plane is substantially parallel to the x-z plane. As previously discussed, coplanar surfaces placed in contact with the y-axis alignment surfaces (135-1, 135-2) are constrained in the y-direction. As a result, placing coplanar surfaces of a component to be aligned in contact with the y-axis alignment surfaces constrains the alignment of the component in the y-direction. A component under these conditions alone, while aligned with respect to the y-axis may be misaligned in the x and/or z directions in the x-z plane.

Placement of a surface of a component against the three z-axis alignment surfaces (140-1, 140-2, and 140-3) fully constrains the orientation of the component with respect to the z axis. An arbitrary orientation would be defined with three points regardless of the location of the three points, since any three points define a plane. In this case, all of the three surfaces are substantially coplanar. As a result, the three coplanar surfaces define an alignment plane. This alignment plane is parallel to the x-y plane.

If a substantially flat surface or corresponding coplanar surfaces of a component are placed in contact with these three alignment surfaces (140-1, 140-2, 140-3) the orientation of the component in the z axis will be fully constrained in the alignment plane. As discussed, the y-axis alignment surfaces (135-1, 135-2) limit misalignment of the component with respect to the y axis in the x-z plane. The z-axis alignment surfaces limit misalignment in the z-direction. If the component is also placed in contact with the z-axis alignment surfaces (140-1, 140-2, 140-3), misalignment in the x-direction in the x-z plane remains as the only source of misalignment.

This source of misalignment may be minimized or eliminated by placing the component in contact with at least one x-alignment datum surface. In the illustrated implementation, a single x-axis alignment surface (145) constrains alignment in the x-direction. As a result, when a component is placed in contact with the rest of the alignment surfaces, the x-axis alignment surface is able to fully constrain the third dimensional orientation of a component.

As discussed, the datum structure (110) insures alignment of a component placed in contact with each of the alignment surfaces. Since the component need only be placed in contact with each of the alignment surfaces, the datum structure (110) allows for the removable coupling of a component to the reflector assembly (110). An example of such a component is a lamp assembly (200), as will be discussed in more detail below.

Figure 2A:
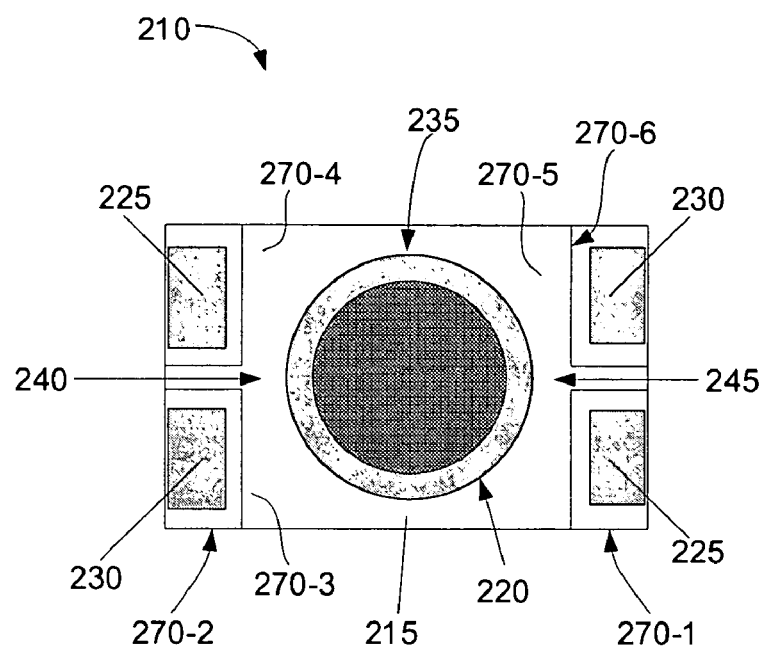
FIG. 2A illustrates an exemplary lamp assembly.
Figure 2B:
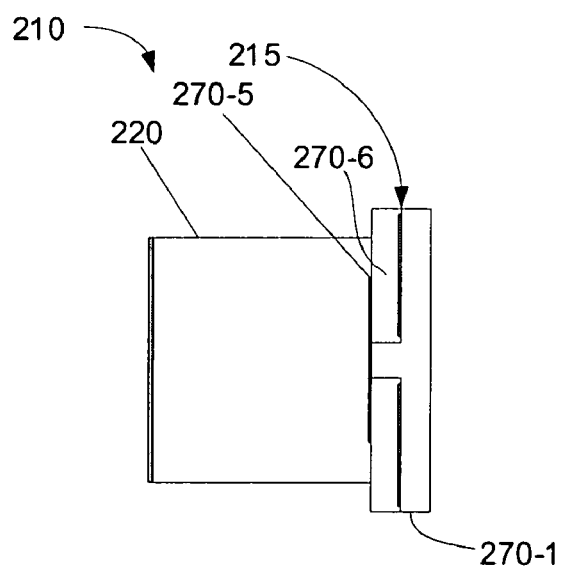
FIG. 2B illustrates an exemplary lamp assembly.
Figure 2C:
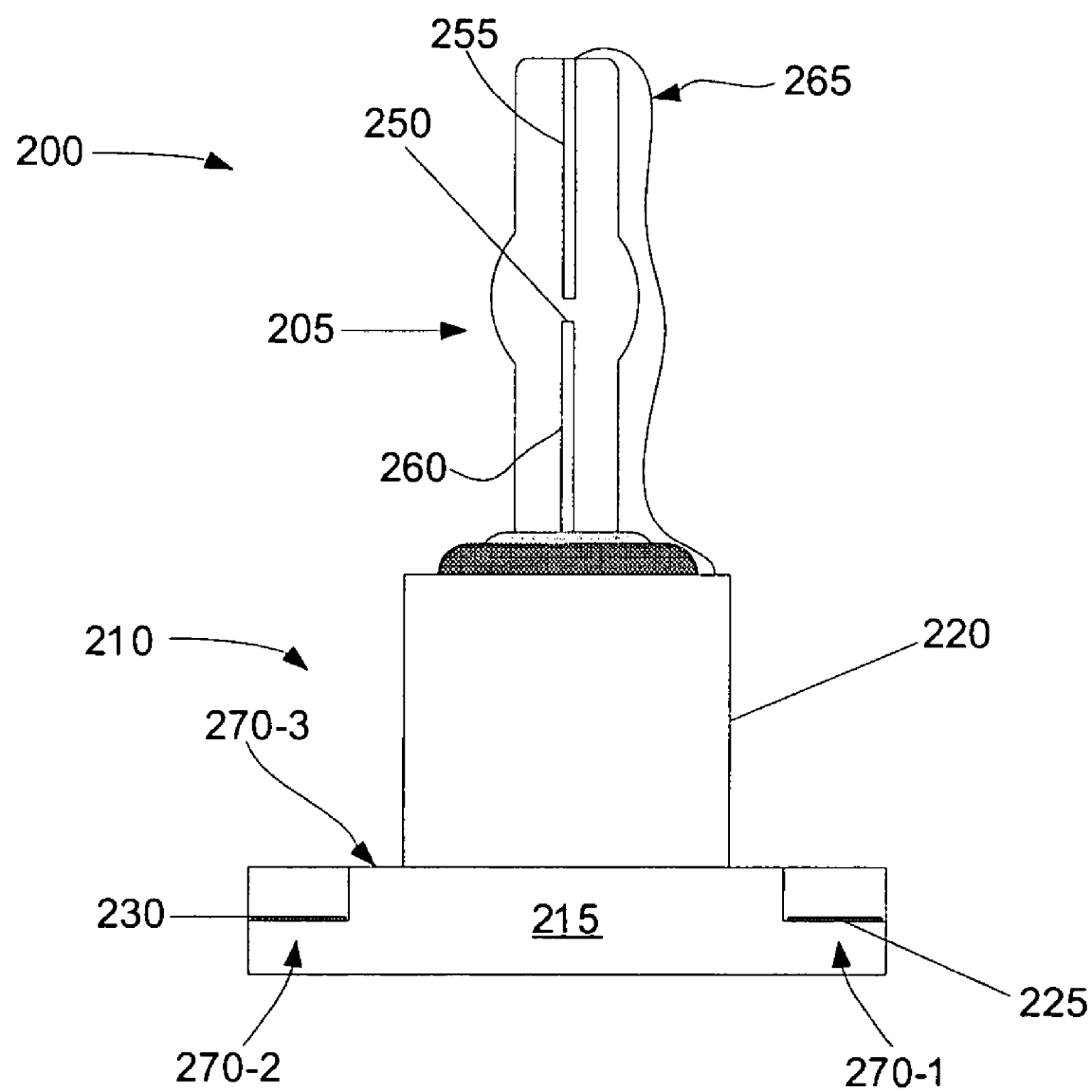
FIG. 2C illustrates an exemplary lamp assembly.

FIGS. 2A–2C illustrate an exemplary lamp assembly (200). The lamp assembly generally includes a lamp (205) coupled to a lamp header (210). The lamp assembly (200) is configured to be coupled to the reflector assembly (100).

The lamp header (210) includes a base member (215), and a lamp engaging member (220) extending away from the base member (215). The base member (215) includes first source connections (225) and second source connections (230) formed on a front or first surface (235) of the base member (215). The first source connections (225) are preferably located in opposing corners of first and second lateral portions (240, 245) of the front surface (235). The second source connections (230) are located in the other opposing corners of the first and second lateral portions (240, 245). As a result, each of the lateral portions (240, 245) includes a first source connection (225) and a second source connection (230).

The lamp (205) may be of any type that produces sufficient light for projection and/or television applications. An example of a lamp is an ultra-high pressure mercury arc lamp. For ease of reference, a UHP lamp will be described in the illustrated implementation. The lamp (205) creates a fireball in a central portion (250) of a mercury vapor or other vapor filled tube that results in the generation of a plasma caused by an arc across first and second electrodes (255, 260). The arc is created by a voltage difference or potential across the first and second electrodes (255, 260).

The potential difference is caused by providing potentials of different polarities to each of the first and second electrodes (255, 260). Any suitable source may be used to provide the potential difference. In the illustrated implementation, the first electrode (255) is connected to a wire (265). The wire (265) extends from the distal end of the lamp (205) to the lamp header (210) where it is connected to an electrical connection, which is part of the lamp header (210). The second electrode (260) is also connected to an electrical connection, which is part of the lamp header. The lamp header (210) is coupled to an external potential source, which provides AC or DC potential to light and operate the lamp assembly (200).

The header (210) includes location surfaces (270-1, 270-2; 270-3, 270-4; 270-5, 270-6) formed on the base member (215) that correspond to the y-axis alignment surfaces (135-1, 135-2), the z-axis alignment surfaces (140-1, 140-2, 140-3) and the x-axis alignment surface (145) respectively. For example, the first location surface (270-1) and the second location surface (270-2) are coplanar and configured to be placed against the y-axis alignment surfaces (135-1, 135-2) in the x-z plane. The third, fourth, and fifth location surfaces (270-3, 270-4, 270-5) are also coplanar and are configured to be placed against the z-axis alignment surfaces (140-1, 140-2, 140-2) in the x-y plane. The sixth location surface (270-6) is configured to be placed against the x-axis alignment surface (145) in the y-z plane. Accordingly, placement of the lamp header location surfaces (270-1, 270-2, 270-3, 270-4, 270-5, 270-6) in contact with the corresponding alignment surfaces results in an aligned and fully constrained alignment between the reflector assembly (100) and the lamp assembly (200).

Exemplary Implementation and Operation

Figure 3:
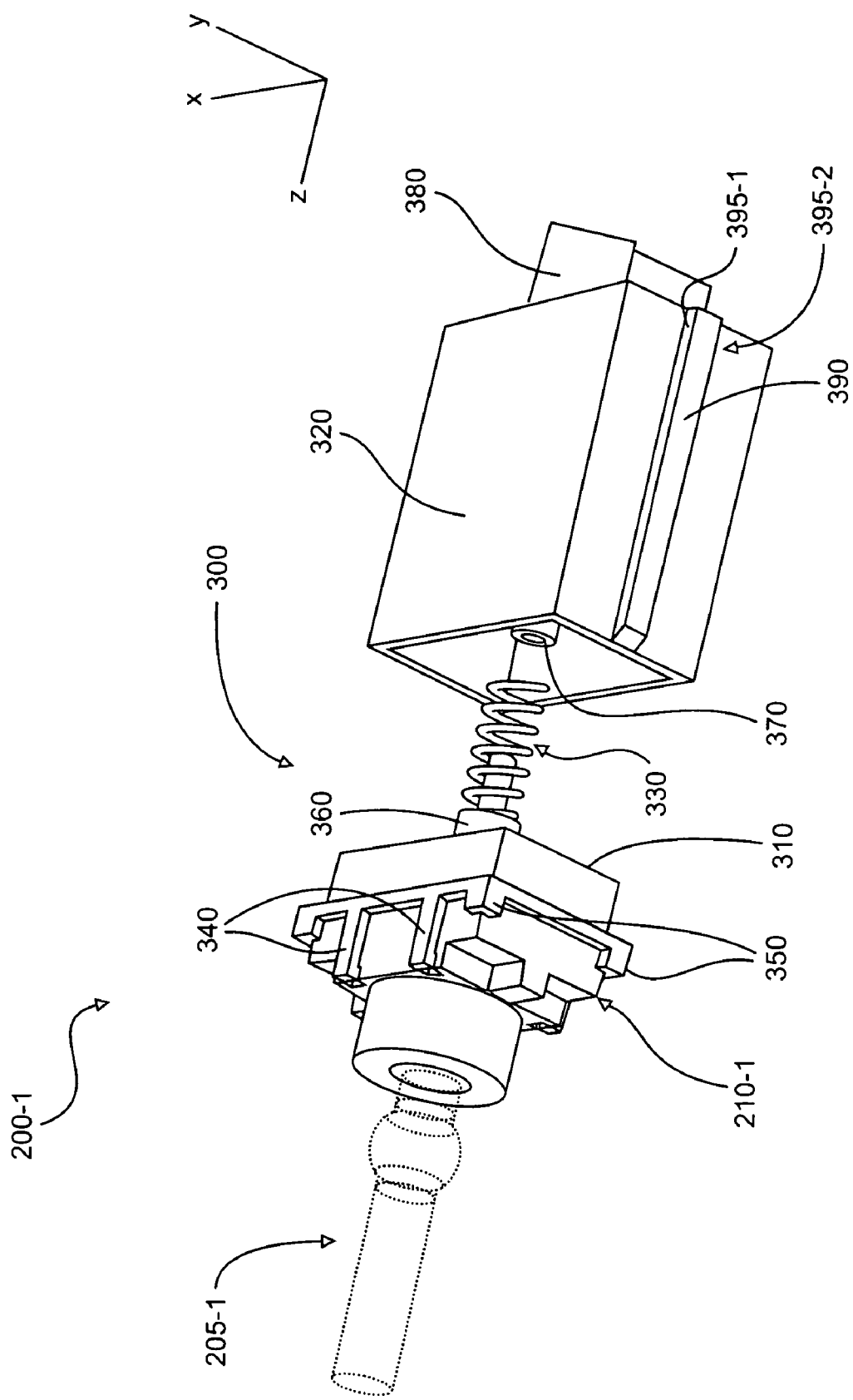
FIG. 3 illustrates an exploded view of an exemplary lamp assembly.

FIG. 3 illustrates a lamp assembly (200-1) that further includes a housing assembly (300). The housing assembly (300) includes a lamp coupling member (310) and a shroud engaging member (320) coupled by a bias spring (330).

The lamp coupling member (310) includes a plurality of latches (340). The latches (340) couple the lamp coupling member (310) to the lamp header (210-1). The lamp coupling member (310) further includes a plurality of alignment tabs (350) on the corners of the lamp coupling member (310). As the lamp header (210-1) is coupled to the lamp coupling member (310), the alignment tabs constrain the location of the lamp header (210-1) with respect to the lamp coupling member (310). This constraint helps to insure that the lamp header (210-1) is aligned with respect to the lamp coupling member (310). The latches (340) secure the lamp coupling member (310) and insure that this alignment is maintained.

The lamp coupling member (310) also includes a spring coupling member (360). The spring coupling member (360) extends in the opposite direction as the latches (340). The spring coupling member (360) secures the bias spring (330) to the lamp coupling member (310). The bias spring (330) is also coupled to the shroud engaging member (320) by way of a spring guide (370) that is contained within the shroud engaging member (320). Accordingly, the bias spring (330) couples the lamp coupling member (310) and the shroud engaging member (320).

The lamp coupling member (310) is configured to fit within the shroud engaging member (320). As the lamp coupling member (310) is pushed into the shroud engaging member (320), the outer portion of the shroud engaging member (320) overlaps the lamp coupling member (310). This relative motion between the lamp coupling member (310) and the shroud engaging member (320) compresses the bias spring (330). The compression of the bias spring causes it to respond by applying a force in the opposite direction. As a result, the force causes bias spring (330) to urge the lamp coupling member (310) toward a biased position. As will be discussed in more detail below, the compression of the bias spring (330) helps maintain the lamp assembly (200-1) in aligned contact with a reflector assembly (100).

The lamp (205-1) is aligned with respect to the reflector assembly (100) such that the lamp (205-1) is placed in an optimal position within the reflector assembly (100). In some embodiments, the optimal position of the lamp (205-1) places the fireball generator of the lamp (205-1) at the focal point of the reflector assembly (100) when the fireball is active.

For instance, the present apparatus also provides for the maintenance of this optimal position, regardless of the mounting configuration of the reflector assembly (100). An indication arrow (380) is preferably formed on one end of the shroud engaging member (320) to provide a visual indicator of the proper orientation of the lamp assembly (200-1). One example mounting configuration for the projector system is on a table. In this configuration, the reflector assembly (100) is in a first orientation. Heat created by the fireball causes it to elevate slightly in the vertical direction. This elevation is taken into account during alignment and, as a result, when the fireball elevates due to the heat, it elevates to its optimal position with respect to the reflector assembly (100). The indication arrow (380) may also be used as a handle or grabbing feature used in inserting or removing the lamp assembly (200-1).

However, when the projector system is inverted, as would be the case if the projector system is mounted to an overhead support such as a ceiling, the reflector assembly (100) is inverted from the first orientation to a second orientation. As a result, in order to maintain the fireball (during operation) in the optimal position with respect to the reflector assembly (100) it may be better to rotate the lamp assembly 180 degrees with respect to the reflector assembly to a second orientation. The indication arrow (380) may also include a textual indicator, indicating that the arrow should be pointing in an upward direction. As a result, the indication arrow (380) provides a simple visual indicator of the proper orientation of the lamp assembly (200-1), regardless of the mounting configuration of the projector assembly.

The outer portion of the shroud engaging member (320) also includes structure, which aids in aligning and coupling the lamp assembly (200-1) to the reflector assembly (100-1). The structure includes a plurality of guide rails (390) formed on opposing sides of the shroud engaging member (320). The first surfaces (395-1) of the guide rails (390) are coplanar to each other. The second surfaces (395-2) are also coplanar to each other and are parallel the first surfaces (395-1). The guide rails (390) are configured to interact with a guide channel (420, FIG. 4) as will be discussed more fully below.

Figure 4:
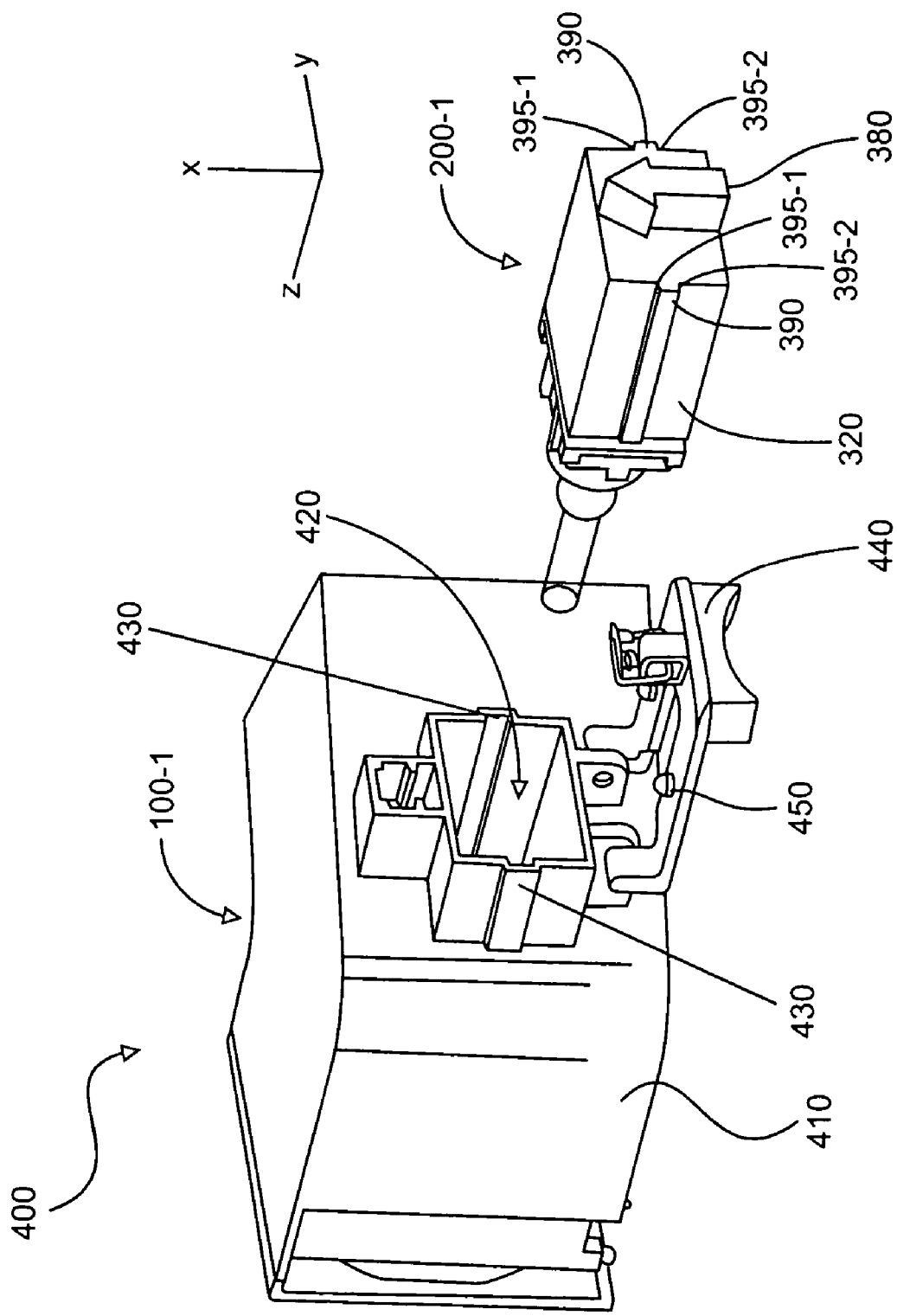
FIG. 4 illustrates an exemplary light generation assembly.

FIG. 4 illustrates an exploded view of a light generation assembly (400). The light generation assembly (400) includes a reflector assembly (100-1), a lamp assembly (200-1) and a shroud assembly (410). The shroud assembly (410) is coupled to reflector assembly (100-1). In addition, the shroud assembly (410) includes a guide channel (420) defined therein, for guiding the lamp assembly (200-1) into contact with the reflector assembly (100-1). The shroud assembly (410) also has a latching assembly (440) pivotably coupled thereto. Engaging the latching assembly (440) helps maintain the lamp assembly (200-1) in contact with the reflector assembly (100).

As previously discussed, the shroud assembly (410) has a guide channel (420) defined therein. The structure of the guide channel (420) helps insure that the lamp assembly (200-1) is properly oriented when it is coupled to the reflector assembly (100-1). The guide channel (420) corresponds to the shape of the shroud engaging member (320). Each has major and minor axes that correspond closely in size with the major and minor axes of the other component. This configuration allows for two orientations between the shroud assembly (410) and the shroud engaging member (320). The two orientations constrain the lamp assembly (200-1) to a first orientation and an orientation rotated 180 degrees from the first orientation. Accordingly, the shape of the guide channel (420) prevents the lamp assembly (200-1) from being improperly oriented with respect to the reflector assembly (100-1).

In addition, the guide channel (420) extends through the shroud assembly (410) thereby providing a guide path for coupling the lamp assembly (200-1) to the reflector assembly (100-1). The guide path is parallel to the z-axis. A plurality of guide slots (430) are formed in opposing sides of the guide channel (420). The guide slots (430) correspond to the guide rails (390) formed on the shroud engaging member (320). The guide slots (430) cause the parallel surfaces (395-1, 395-2) of the guide rails (390) to be aligned with the x-z plane. As the lamp assembly (200-1) is coupled to the reflector assembly (100-1), the guide rails (390) slide in the z direction along a plane parallel to the x-z axis. The planar interactions of the first and second surfaces (395-1, 395-2) and the guide slots (430) prevent rotation of the lamp assembly (200-1) in the x-y and x-z planes. Accordingly, the direction of the lamp assembly (200-1) is oriented in all but the z direction as the lamp assembly (200-1) is coupled to the reflector assembly (100-1).

As previously discussed, the lamp assembly includes a shroud engaging member (320) coupled to a lamp coupling member (310). The inner surface of the shroud engaging member (320) corresponds closely to the outer surface of the lamp coupling member (310). The latching assembly (440) is configured to interact with the lamp assembly (300) to apply a biasing force in the z direction to the lamp header (210-1). This biasing force allows the lamp header (210-1) to remain in contact with the datum structure (110; FIG. 1), as discussed above.

In operation, the lamp assembly (200-1) is coupled to the reflector assembly (100-1) by passing the lamp (205-1) through the shroud assembly (410) and at least partially through the reflector opening (105; FIG. 1). The lamp assembly (100-1) is moved in the z-direction until the lamp header (210-1) makes contact with the datum structure (110; FIG. 1). As previously discussed, placing the alignment surfaces of the datum structure (110; FIG. 1) in contact with the location surfaces of the lamp header (210-1) results in a fully constrained alignment between the two. The latching assembly (440) is then closed.

Closing the latching assembly results in the application of a resilient biasing force to the lamp header (210-1). The latching assembly (440) includes a plurality of force creating surfaces (450). The force creating surfaces are positioned on the latching assembly (440) such that they apply force across the x-y center of the shroud engaging member (320) by displacing the bias spring (330). As previously discussed, the application of this force causes the lamp coupling member (310) to move with respect to the shroud engaging member (320).

As may be best seen with reference to FIG. 3, the inner portion of the shroud engaging member (320) moves past the outer portion of the lamp coupling member (310) such that an increasing portion of each shroud engaging member (320) overlaps the lamp coupling member (320). The relative motion causes the bias spring (330) to compress. The spring guide (370) helps insure that shroud engaging member (320) moves in the z-direction.

Returning to FIG. 4, while the bias spring (330) is compressed, the latching assembly (440) is closed by securing it to the shroud assembly (410). While the latching assembly (440) is closed, the bias spring (330) continues to urge the lamp coupling member (310) away from the shroud engaging member (320). Consequently, the bias spring (330) applies a force to the lamp header (210). As discussed, this force helps to insure that the z-axis alignment surfaces of the datum structure (110; FIG. 1) remain in contact with the z-axis location surfaces of the lamp header (210-1).

The configuration of the lamp assembly facilitates the removable coupling of the lamp assembly to a reflector assembly without the use of tools. As a result, when the lamp has surpassed its useful life, the lamp assembly alone may be replaced, without requiring the replacement of the reflector assembly as well. Typically this lowers service and replacement part costs, thus lowering cost of ownership. In addition, the electrical interconnects contained within the lamp assembly allow the lamp to be electrically coupled to a power source while installed in the reflector assembly without requiring electrical routing to pass through additional holes in the reflector assembly. This configuration improves the effective light output of the lamp, that is, the amount of light produced by the lamp that actually reaches the projection assembly of the projector system.

Figure 5A:
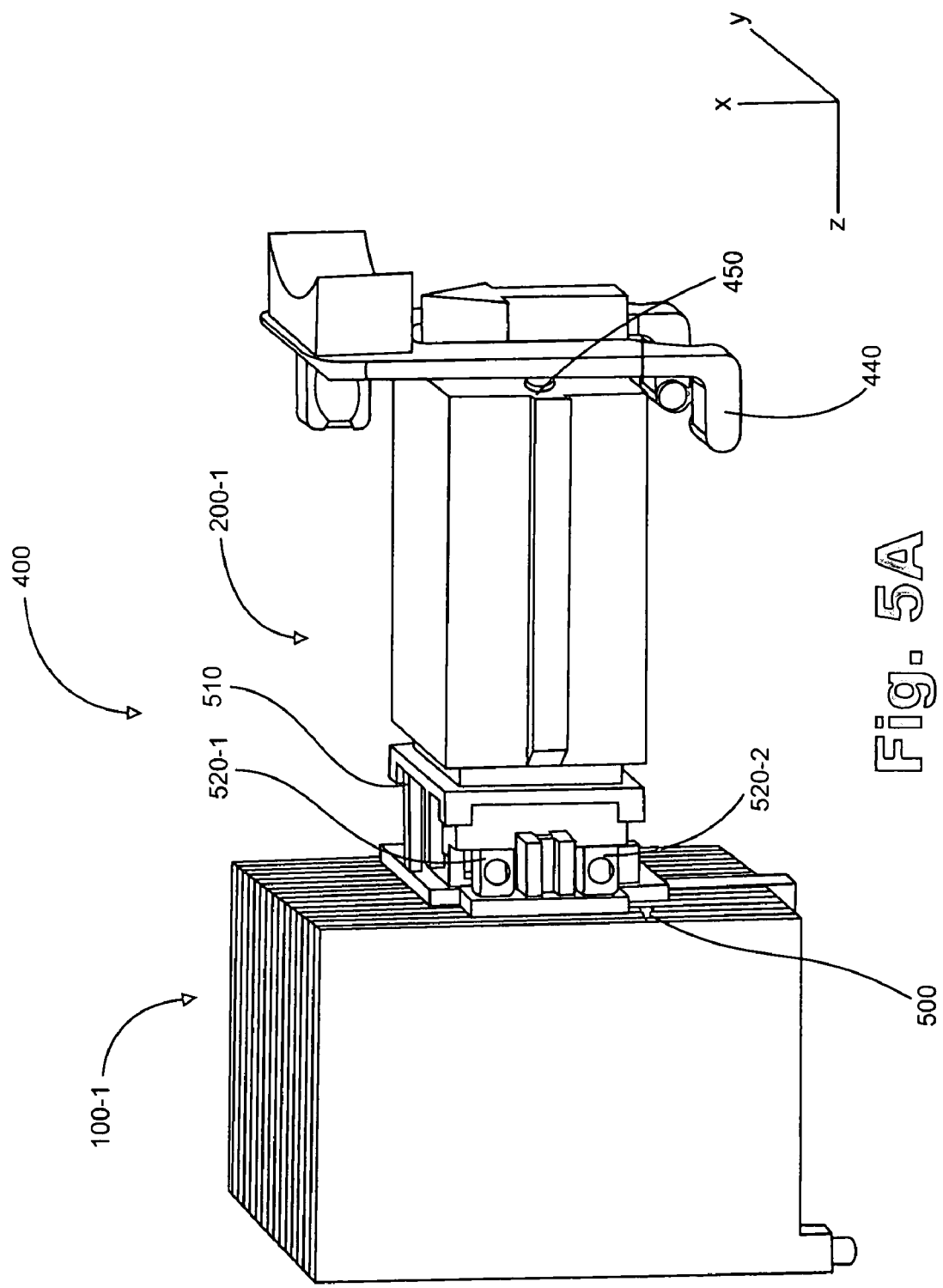
FIG. 5A illustrates the light generation assembly of FIG. 4 with the shroud assembly removed.
Figure 5B:
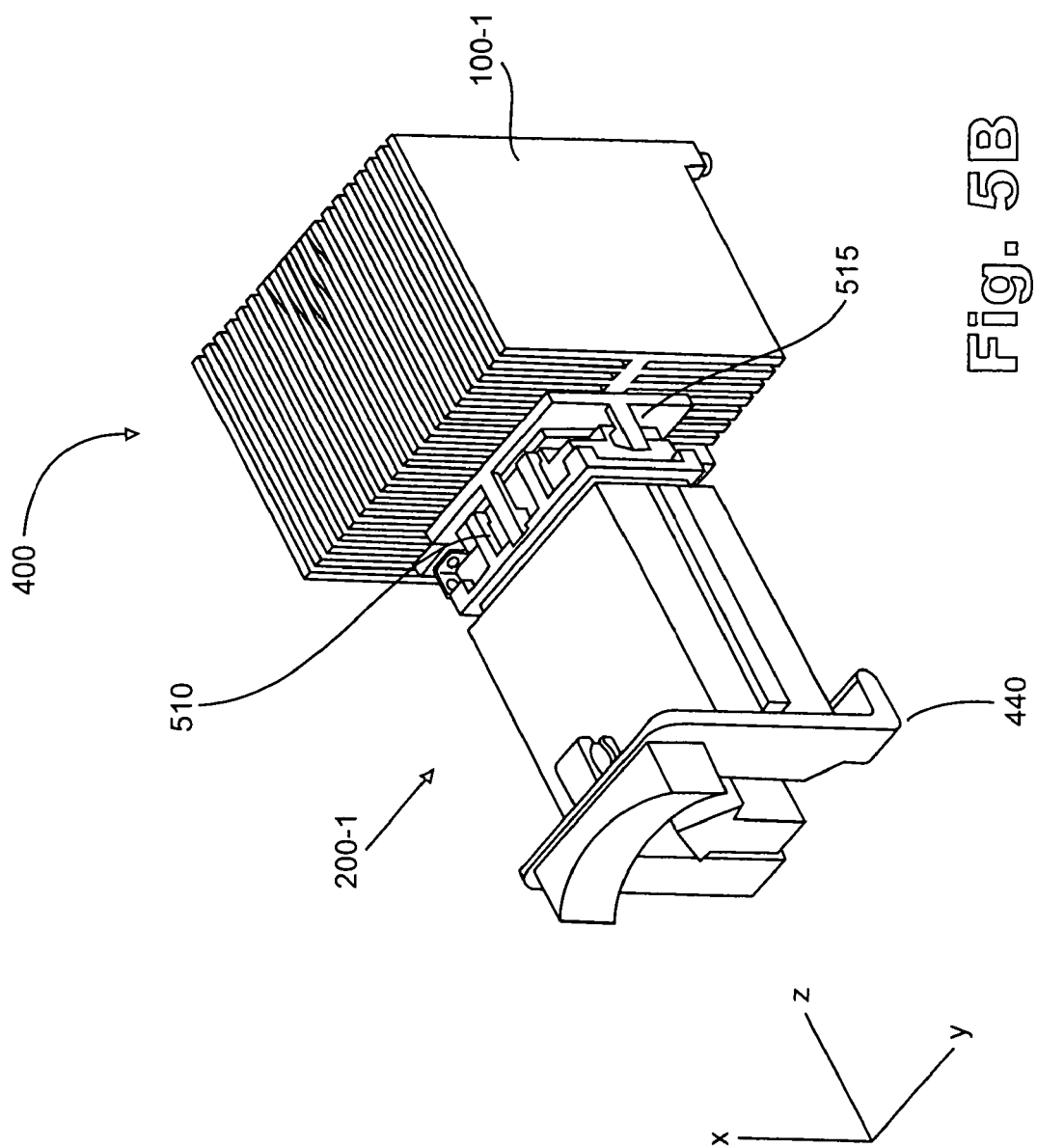
FIG. 5B illustrates the light generation assembly of FIG. 4 with the shroud assembly removed.

FIGS. 5A–5B illustrates the light generation assembly (400) of FIG. 4 with the shroud assembly (410) removed to illustrate the interaction between the lamp assembly (200-1) and the reflector assembly (100-1). The reflector assembly (100-1) further includes a compliant biasing assembly (500,). The compliant biasing assembly (500) is coupled to a perimeter of the datum structure (110; FIG. 1). The compliant biasing assembly (500) includes a plurality of compliant biasing members (510, 515). When coupled to the reflector assembly (100), the compliant biasing members (510, 515) extend away from the reflector assembly (100) in the y-direction and the compliant biasing member (515) extend away from the reflector assembly (100) in the x-direction. As a result, the compliant biasing assembly (500) applies a force to the lamp assembly (200) helping to maintain the lamp assembly (200) alignment in the x-y plane. For example, in the event that lamp assembly (200) begins to move in the x-y plane from its aligned position, the compliant biasing members (510, 515) begin to deflect more. The stiffness of the compliant biasing members (510, 515) causes the compliant members to resist this deflection. In other words, the compliant biasing members (510, 515) act as 'springs' in that they resist that deflection. Accordingly, the compliant biasing members (510, 515) help to ensure that the lamp header (210-1) remains in contact with the alignment surfaces by increasing the biasing force to the lamp header (210-1) as it begins to move from its aligned position.

FIGS. 5A–5B also illustrates first and second power interconnects (520-1, 520-2). Once the lamp assembly (200-1) has been coupled to the reflector assembly (100-1) and the latching assembly (440) has been closed, an electrical connection is made between the lamp assembly (200-1) and the power connections (520-1, 520-2). As discussed with reference to FIG. 2, the lamp assembly includes both first and second source connections (225, 230) on each of the first and second lateral portions (240, 245). The first power interconnect (520-1) is coupled to one of the first source connections (225) while the second power interconnect (520-1) is coupled to one of the second source connections (230). This configuration allows the electrical connections to be established regardless of whether the lamp assembly is in a first orientation or rotated 180 degrees in the x-y axis from the first orientation. The first and second power interconnects (520-1, 520-2) are configured to apply a force to the lamp header (210-1). Closing the latching assembly (440) causes the power interconnects (520-1, 520-2), which are resilient, to deflect slightly thereby causing a force to created against the lamp header (210-1). This force allows the power interconnects (520-1, 520-2) to provide substantially continuous power to the lamp assembly (200-1), even in the event of shock loading to the projection device.

From time to time it may be desirable to change the mounting orientation of the projector system. In such events, the lamp assembly (200-1) may optionally be rotated 180 degrees with respect to the reflector assembly (100-1) in order to maximize the performance of the projection system based on the mounting configuration of the projector system. Once the lamp has outlived its useful life, the lamp assembly may be replaced. The ability to replace the lamp assembly (200-1) without replacing the reflector assembly (100-1) significantly lowers the cost of ownership of the projector system. Lower operating costs may in turn increase the sales of projector systems into consumer environments.

Figure 6:
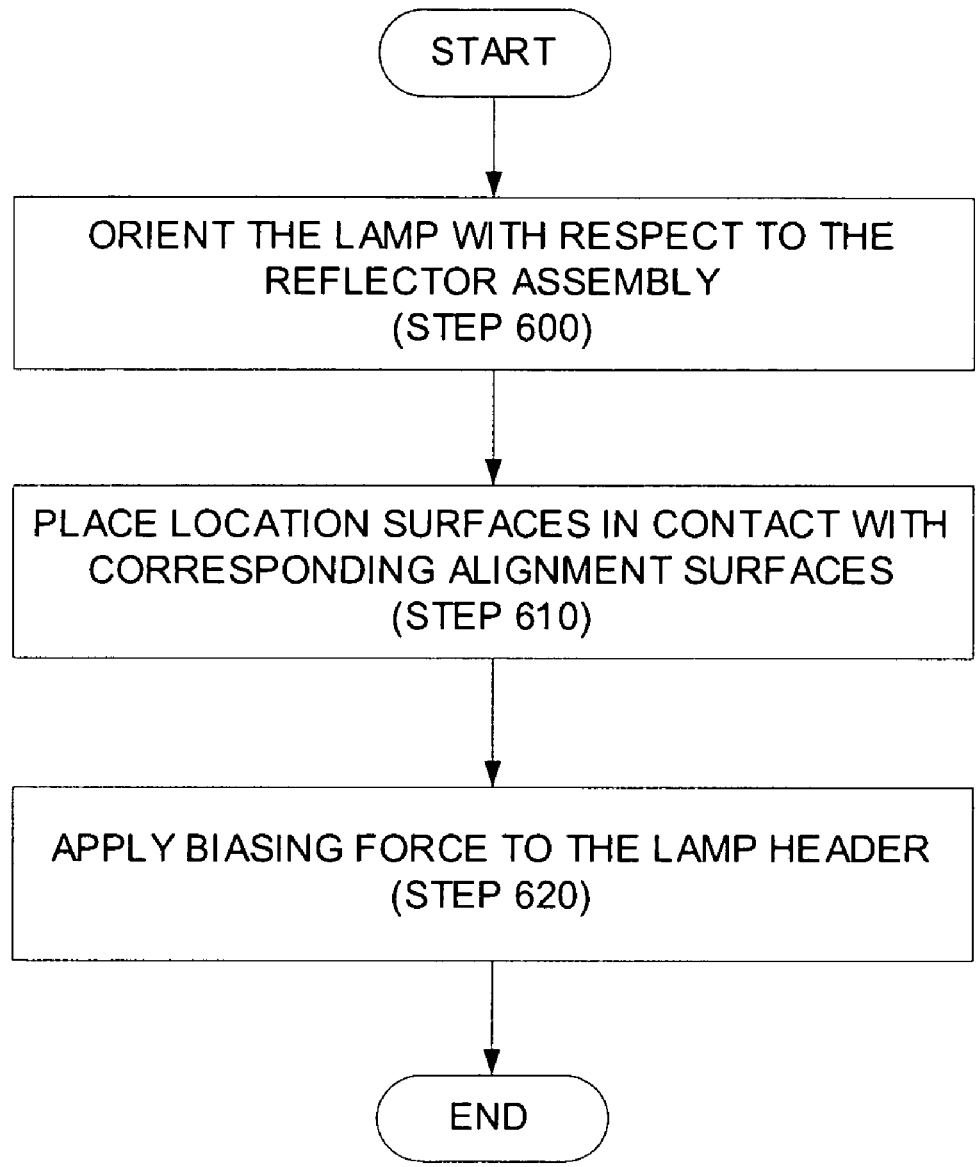
FIG. 6 illustrates an exemplary method of using a light generation assembly.

FIG. 6 is a flowchart illustrating a method of ensuring proper alignment of a lamp assembly with respect to a reflector assembly. The reflector assembly includes a datum structure coupled thereto. The datum structure includes a plurality of datum alignment surfaces. These datum alignment surfaces correspond to complimentary or locating surfaces on a lamp header portion of the lamp assembly. As will be discussed in more detail below, when the locating surfaces are placed in contact with the corresponding datum alignment surfaces, the lamp assembly is fully aligned with respect to the reflector assembly.

The method begins by orienting the lamp assembly with respect to the reflector assembly (step 600). For example, when viewed from the rear the lamp assembly may have a generally rectangular profile, with major and minor axes. The reflector assembly has a shroud having an opening defined therein. The shape of the opening in the shroud closely corresponds to the profile of the lamp assembly as viewed from the rear. In the illustrated implementations, the opening in the shroud is a guide channel. Accordingly, the structure of the guide channel helps insure that the lamp assembly is properly oriented when it is coupled to the reflector assembly. Accordingly, the shape of the guide channel prevents the lamp assembly from being improperly coupled to the reflector assembly.

The guide channel extends through the shroud assembly thereby providing a guide path for coupling the lamp assembly to the reflector assembly. The initial orientation of the lamp assembly may be further enhanced by the use of a plurality of guide slots formed in opposing sides of the guide channel. As previously discussed, the planar interactions of guide rails formed on the lamp assembly and the guide slots provide an initial orientation of the lamp assembly in the x-y and x-z planes. Accordingly, the direction of the lamp assembly is constrained in all but the z direction.

Once the lamp assembly has been oriented with respect to the lamp assembly, the location surfaces are placed in contact with the alignment surfaces (step 610). As previously discussed, placing the location surfaces in contact with the alignment surfaces fully constrains the motion of the lamp assembly with respect to the reflector assembly. In the light generation assembly (400) discussed with reference to FIG. 4, the location surfaces are surfaces of the lamp header. Each of the location surfaces corresponds to one of six datum alignment surfaces on the reflector assembly. The datum alignment surfaces include three z-axis alignment surfaces, two y-axis alignment surfaces, and one x-axis alignment surfaces.

A biasing force is then applied to the lamp header (step 620). The biasing force urges the location surfaces into contact with the alignment surfaces. Accordingly, the application of the biasing force maintains the lamp assembly in aligned contact with the reflector assembly. The biasing force may be applied in a plurality of directions. For example, closing the latching assembly coupled to the may compress the bias spring between the lamp coupling member and the shroud engaging member. The bias spring applies a force in the z-direction.

In addition, the compliant biasing assembly applies a biasing force to the lamp header. The compliant biasing members lie in the x-y plane. According, the compliant biasing members apply a biasing force as they resist deflection.

The configuration of the lamp assembly facilitates the removable coupling of the lamp assembly to a reflector assembly without the use of tools. As a result, when the lamp has surpassed its useful life, the lamp assembly alone may be replaced, without requiring the replacement of the reflector assembly as well. Typically this lowers service and replacement part costs, thus lowering cost of ownership. In addition, the electrical interconnects contained within the lamp assembly allow the lamp to be electrically coupled to a power source while installed in the reflector assembly without requiring electrical routing to pass through additional holes in the reflector assembly. This configuration improves the effective light output of the lamp, that is, the amount of light produced by the lamp that actually reaches the projection assembly of the projector system.

Figure 7:
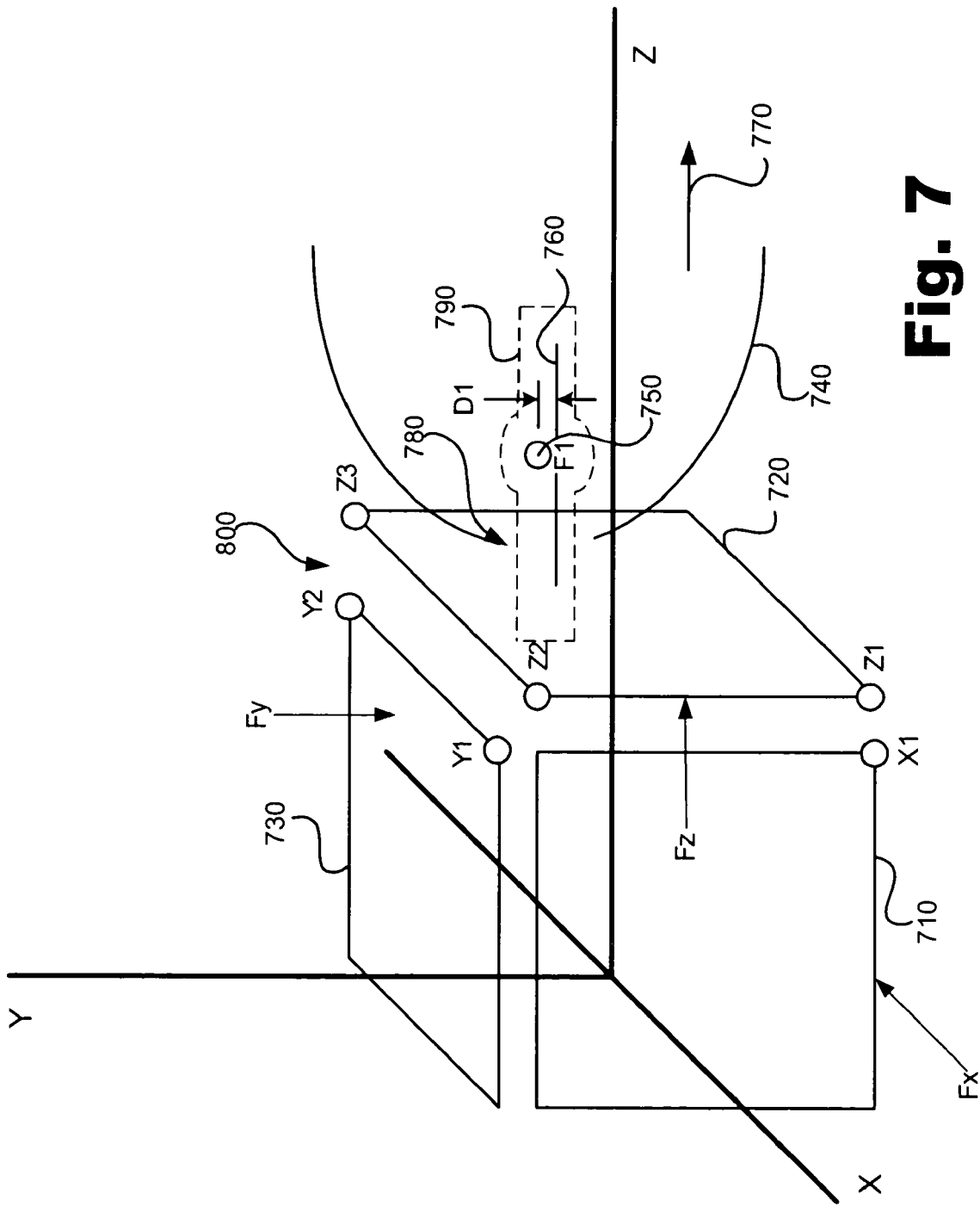
FIG. 7 illustrates a schematic representation of an exemplary light generation assembly.

While one embodiment has been shown and described, the datum structure can be incorporated into a bulb header and reflector assembly in several ways as best fits a particular design. In general, the datum structure can be described as shown in FIG. 7 and with reference to the previous drawings. A reflector (740) has a hyperbolic surface, preferably elliptical or parabolic although those of skill in the art know other hyperbolic surfaces that can be used. The reflector (740) has a focal point (F1) in which light concentrated from a light source (790 is emitted for reflection off the hyperbolic surface. The reflector (740) also defines and has an opening (780) for insertion of the light source (790). The light source (790) is preferably of a type that has a small origin of light emission (750), such as a fireball in a highly compressed gas light source. Examples of highly a highly compressed gas light sources may include mercury vapor or xenon arc lamps. Alternatively, the origin of light emission may be a laser or light emitting diode(s) made of semiconductor or organic materials. A datum structure (800) is provided on the reflector (740) or on a housing coupled to the reflector (740). The purpose of the datum structure is to orient the origin of light emission (750) to the focal point F1 of the hyperbolic surface. However, for some light sources such as a gas vapor arc lamp, the origin of light emission (750) of the light source may move during operation due to gravitational or other force effects (i.e. magnetic fields). Thus, the datum structure (800) is preferably designed such that when the light source (790) is fully inserted (in direction 770) in the reflector (740), the origin of light emission (750) is located or otherwise disposed near the focal point F1 of the reflector (740). This would imply that there could be a possible offset (D1) from the center axis (760) of the light source (790). The center axis (760) of an arc lamp would be along the pair of electrodes (255, 260; FIG. 2C).

The datum structures (800) of the reflector and light source (790) mate such that there is precise alignment in an X, Y, and Z axis. The Z axis is defined herein as the direction of insertion (770), and the X and Y axes are defined to be orthogonal to the Z axis and each other. Although, the X, Y, an Z axis are described herein as orthogonal (such as in rectangular coordinates), other axes could be used that are non-orthogonal such as with a cylindrical or polar coordinate system. The datum structure (800) of the reflector (740) has a first surface or point (Z1), a second surface or point (Z2), and a third surface or point (Z3) that together define a first plane (720) that is preferably orthogonal to the direction of insertion (770) of the light source (790). The datum structure (800) of the reflector (740) also includes a fourth surface or point (Y1) and a fifth surface or point (Y2) that limit the direction of travel of the light source (790) in a first direction (the Y axis) that is orthogonal to the direction of insertion (770). A sixth surface or point (X1) is also included to limit the direction of travel in a second direction to the X axis that is orthogonal to both the first direction and the direction of insertion (770).

In order to allow for ease of alignment during insertion of the light source (790) into the reflector opening (780), the datum structure of the reflector may include at least one beveled edge that is disposed adjacent to any of the fourth, fifth, or sixth surfaces or points (Y1, Y2, and X1, respectively). Alternatively, the reflector may include at least one guide slot, such as guide slots (390; FIG. 3), for orienting the light source (790) in the first and/or second directions during insertion. Another option, alone or in combination with the aforementioned, is to have the reflector opening (780) define a guiding surface (such as a truncated cone) to allow for orienting the light source (790) in both the first and second directions during insertion.

To prevent movement of the light source after it has been inserted into the reflector and to maintain proper alignment, one or more bias members (Fx, Fy, Fz) may be used to provide a force in the X, Y and Z directions, respectively. Several different methods to provide the bias force include mechanical (such as springs), magnetic (using opposite or attractive forces depending on the design), or electrostatic forces (such as with voltage or charge control). Optionally, a latch may be provided to apply the biasing force on the light source against the first, second, and third surfaces. Preferably, the datum structure is oriented around the opening of the reflector such as in FIG. 1.

In some applications, the light source may generate a sufficient amount of heat and it may be preferable to include a heat sink on the reflector or its housing (See FIG. 1) to control the temperature of the datum surface thus controlling movement possibly due to thermal expansion.

In some applications, the reflector (740) may provide electrical connections to allow for interfacing the light source (790) with a power source. When the light source (790) has an offset (D1) from the origin of the light (750) to the center axis (760) of the light source (790), it is preferable to have the electrical connection allow for the insertion of the light source (750) in more than one rotational orientation about the Z axis.

The light source (790) may also include a datum structure that is incorporated into a header assembly that holds the light source (790). The header (210; FIG. 2) has a first surface or point, a second surface or point and a third surface or point that define a plane, such as first plane (720). The header also includes a fourth surface or point, and a fifth surface or point oriented in an orthogonal plane, such as first orthogonal plane (730) or in a direction to the first plane (720). A sixth surface or point is oriented in a second orthogonal plane (710) or direction to the first plane (720). The first, second, third, fourth, fifth, and sixth surfaces are used to define a datum to the origin of the light source (750) during its operation. Thus, this datum location may be referenced to an offset (D1) from the center axis (760) of the light source (790). If there is an offset (D1), such as with an arc lamp, the light source (790) preferably includes a direction indicator on the header or a housing assembly attached to the header. This direction indicator indicates the proper positioning of the light source (790) with respect to a reflector assembly to make sure the focal point (F1) of the reflector (740) is aligned with the origin of the light emission (750) during operation.

The light source (790) may further include a housing assembly that is coupled or otherwise fastened to the header (210; FIG. 2) to allow for user handling and/or for providing at least one biasing member (such as 330; FIG. 3) to apply the bias forces described earlier. Optionally, the biasing forces can be provided on the reflector housing such as with compliant bias members (510, 515; FIG. 5B). In addition, the housing assembly may include guide rails (390) to help orient the light source in at least one direction orthogonal to the direction of first plane (720). Optionally or in addition, the header may include a guiding surface (220; FIG. 2) that is substantially orthogonal (although there may be some slight taper) to the first plane. This guiding surface (220) mates to the guiding surface in the reflector housing and limits the direction of travel of the header and light source in a first direction and/or second direction that are orthogonal to the direction of insertion (770).

The header preferably includes electrical connections that are coupled to the light source (790) and are designed to interface to the electrical connections on the reflector (740).

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A light source assembly configured for installation into a reflector assembly including a reflector, the reflecting assembly having a datum structure, the light source assembly comprising:
   a lamp having an emitting portion for emitting light; and
   a header supporting the lamp and defining a plurality of datum surfaces for engaging corresponding datums that are defined by the datum structure, the datum surfaces are disposed and arranged to assure proper alignment of the emitting portion relative to the reflector, wherein the lamp includes a distal portion, the reflector assembly defines an opening for receiving the distal portion in a first direction of installation of the lamp assembly into the reflector assembly.

2. The light source assembly of claim 1 wherein the light source assembly is configured for installation into the reflector assembly in a first direction of installation, the datum structure includes a corresponding first datum for constraining the installation of the light source in the first direction, the datum surfaces include a first datum surface for engaging the first datum to properly align the emitting portion in the first direction.

3. The light source assembly of claim 2, wherein the first datum surface is disposed substantially perpendicular to the first direction.

4. The light source assembly of claim 2, the lamp includes distal portion, wherein the reflector assembly defines an opening for receiving a distal portion, the first datum surface engages the first datum adjacent to the opening.

5. The light source assembly of claim 1, wherein the reflector assembly includes a second datum, the light source assembly includes a second datum surface that engages the second datum with an engagement force that is aligned substantially perpendicular to the first direction.

6. The light source assembly of claim 5 wherein the second datum engages the second datum adjacent to the opening.

7. The light source assembly of claim 1 wherein the datum surfaces engage the corresponding datums in an arrangement that is adjacent to the opening.

8. The light source assembly of claim 1 further comprising a housing portion that supports the header and is configured to be installed into the reflector assembly in a direction of installation of the light source assembly into the reflector assembly.

9. The light source assembly of claim 8 wherein the housing portion includes a latching portion for engaging a corresponding latch portion of the reflector assembly, the latching portion is located on a trailing portion of the housing portion relative to the direction of installation.

10. A light source assembly configured for installation into a reflector assembly including a reflector, the reflecting assembly having a datum structure, the light source assembly comprising:
a lamp having an emitting portion for emitting light; and
a header supporting the lamp and defining a plurality of datum surfaces for engaging corresponding datums that are defined by the datum structure, the datum surfaces are disposed and arranged to assure proper alignment of the emitting portion relative to the reflector; and
a housing portion that supports the header and is configured to be installed into the reflector assembly in a direction of installation of the light source assembly into the reflector assembly, wherein the housing portion includes a spring that exerts a spring force against the header assembly that biases at least one of the datum surfaces against one of the corresponding datums when the light source assembly is properly installed in the reflector assembly.

11. A light source, comprising:
a header having;
first, second, and third surfaces defining a first plane,
fourth and fifth surfaces oriented in a first orthogonal direction to the first plane, and
a sixth surface oriented in a second direction orthogonal to the first plane; and
an origin of light located at a first location with respect to said header when said light source is operating and wherein said first, second, third, fourth, fifth and sixth surfaces define a datum to said first location.

12. The light source of claim 11, and further comprising a housing assembly coupled to said header.

13. The light source of claim 12, and further comprising guide rails coupled to said header and being oriented in a direction orthogonal to said first plane.

14. The light source of claim 12, and wherein said housing assembly further includes a biasing force member configured to apply a force in a direction orthogonal to said first plane.

15. The light source of claim 12, and wherein said housing assembly further includes guide rails oriented in a direction orthogonal to said first plane.

16. The light source of claim 11, and wherein said header includes electrical connections coupled to said light source.

17. The light source of claim 11, and wherein said header further comprises a guiding surface substantially orthogonal to said first plane for limiting a travel of said origin of light in a first direction and a second direction, wherein said first and second directions are parallel to said first plane.

18. The light source of claim 11, further comprising a direction indicator coupled to said header for indicating a correction orientation of said light source with respect to a reflector assembly.

19. The light source of claim 11, further comprising at least one biasing member configured to apply a force in a direction normal to at least one of said first plane, said first orthogonal direction, or said second orthogonal direction when said light source is inserted in a reflector assembly.

20. The light source of claim 11, wherein the light source comprises an arc lamp.

21. A lamp assembly, comprising:
a lamp having a fireball generator and being coupled to a lamp header;
wherein said lamp header includes a plurality of datum surfaces defined thereon configured to ensure proper orientation and alignment of said fireball when operating with respect to a reflector assembly; and
a housing assembly coupled to said lamp header, wherein said housing assembly comprises a lamp coupling member, a bias spring, and a header engaging member wherein said bias spring couples said lamp coupling member and said header engaging member.

22. The assembly of claim 21, wherein said lamp coupling member is configured to slide between a biased an and unbiased position with respect to said header engaging member and said bias spring is configured to urge said lamp header toward said biased position.

23. The assembly of claim 21, wherein said housing assembly further comprises a direction indicator.

24. The assembly of claim 23, wherein said direction indicator comprises an arrow.

25. The assembly of claim 21, wherein said housing assembly further comprises a plurality of guide rails disposed thereon.

26. The assembly of claim 21, wherein said lamp header further comprises a plurality of source connections formed thereon for coupling said lamp assembly to an external power source.

27. The assembly of claim 21, further comprising a plurality of locating surfaces configured to interact with datum surfaces of a reflector assembly.

* * * * *